United States Patent
Kakutani

(10) Patent No.: US 11,947,849 B2
(45) Date of Patent: Apr. 2, 2024

(54) PRINTING APPARATUS RECEIVING AUTHENTICATION INFORMATION, METHOD FOR CONTROLLING THE SAME, SERVER APPARATUS HAVING AN AUTHENTICATION FUNCTION, METHOD FOR CONTROLLING THE SAME, AND STORAGE MEDIUM

(71) Applicant: CANON KABUSHIKI KAISHA, Tokyo (JP)

(72) Inventor: Naoya Kakutani, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/583,890

(22) Filed: Jan. 25, 2022

(65) Prior Publication Data
US 2022/0244896 A1    Aug. 4, 2022

(30) Foreign Application Priority Data

Jan. 29, 2021 (JP) .................................. 2021-012780

(51) Int. Cl.
*G06F 3/12* (2006.01)
*H04L 41/0806* (2022.01)

(52) U.S. Cl.
CPC .......... *G06F 3/1238* (2013.01); *G06F 3/1222* (2013.01); *G06F 3/1288* (2013.01); *H04L 41/0806* (2013.01)

(58) Field of Classification Search
None
See application file for complete search history.

(56) References Cited

U.S. PATENT DOCUMENTS

| 2008/0189775 A1 | 8/2008 | Fujita |
| 2018/0145990 A1 | 5/2018 | Diacetis et al. |
| 2020/0106921 A1* | 4/2020 | Nakayama ........... H04N 1/4413 |
| 2020/0183628 A1 | 6/2020 | Boo et al. |
| 2020/0293670 A1 | 9/2020 | Haapanen |

FOREIGN PATENT DOCUMENTS

| JP | 2019155610 A | 9/2019 | |
| WO | WO-2018147513 A1 * | 8/2018 | ............. G06F 21/31 |

OTHER PUBLICATIONS

English translation of WO-2018147513-A1. (Year: 2018).*

* cited by examiner

*Primary Examiner* — Thomas D Lee
(74) *Attorney, Agent, or Firm* — Canon U.S.A., Inc. IP Division

(57) ABSTRACT

A server with which a first printing apparatus and a second printing apparatus communicate via a network, includes a reception unit and a transmission unit. The reception unit receives first information from the first printing apparatus and receives second information different from the first information from the second printing apparatus. The transmission unit transmits, to the first printing apparatus, one or a plurality of types of user authentication methods corresponding to the first information for logging in the first printing apparatus, and transmits, to the second printing apparatus, one or a plurality of types of user authentication methods corresponding to the second information for logging in the second printing apparatus that includes at least one type different from the one or plurality of types of user authentication methods corresponding to the first information.

19 Claims, 16 Drawing Sheets

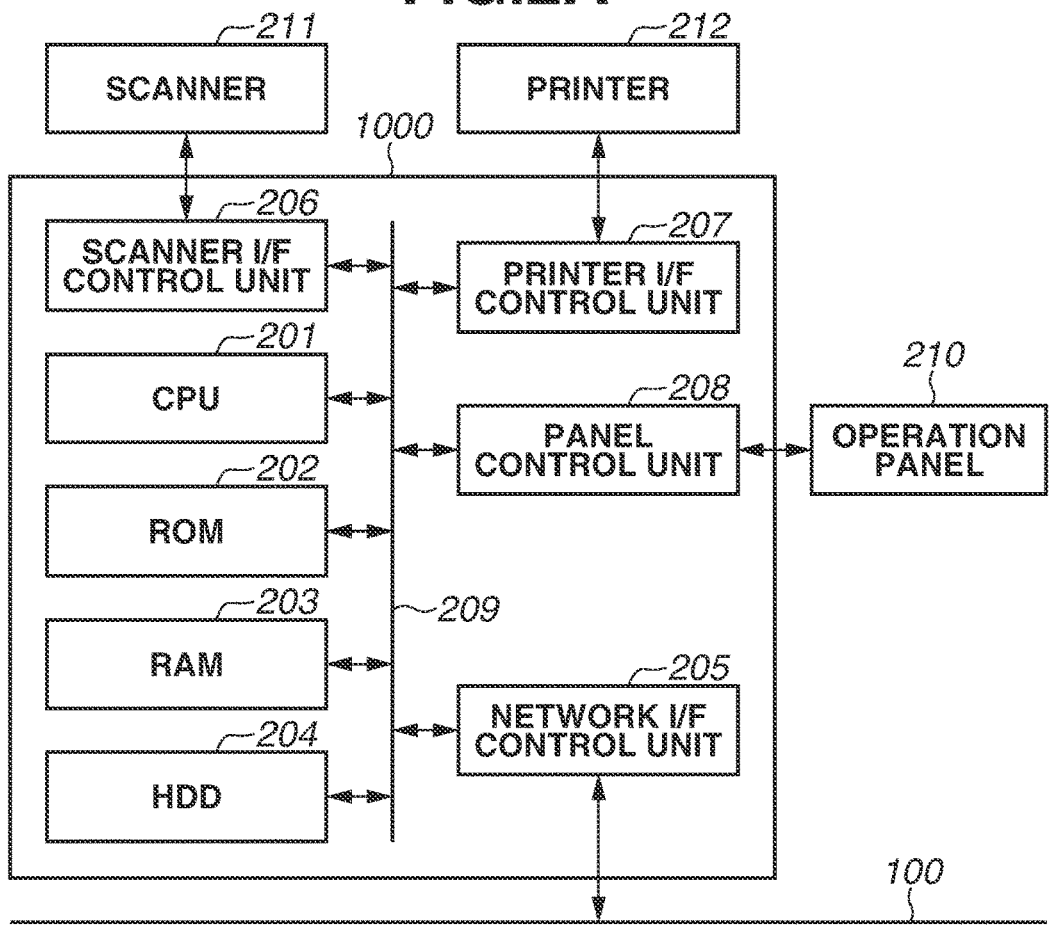
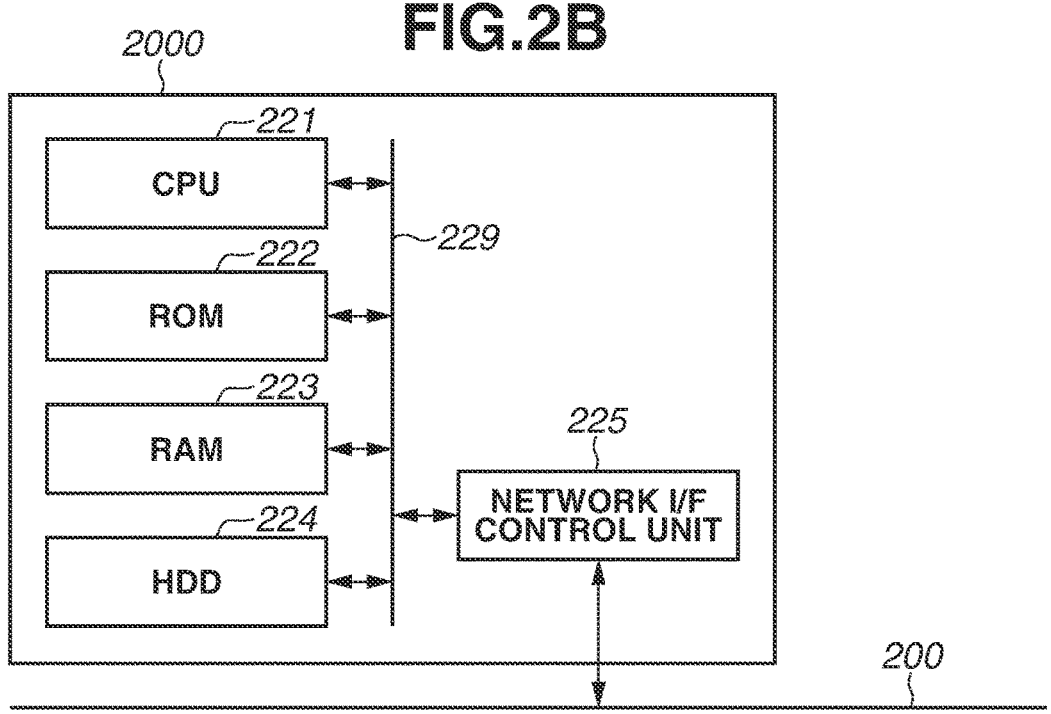

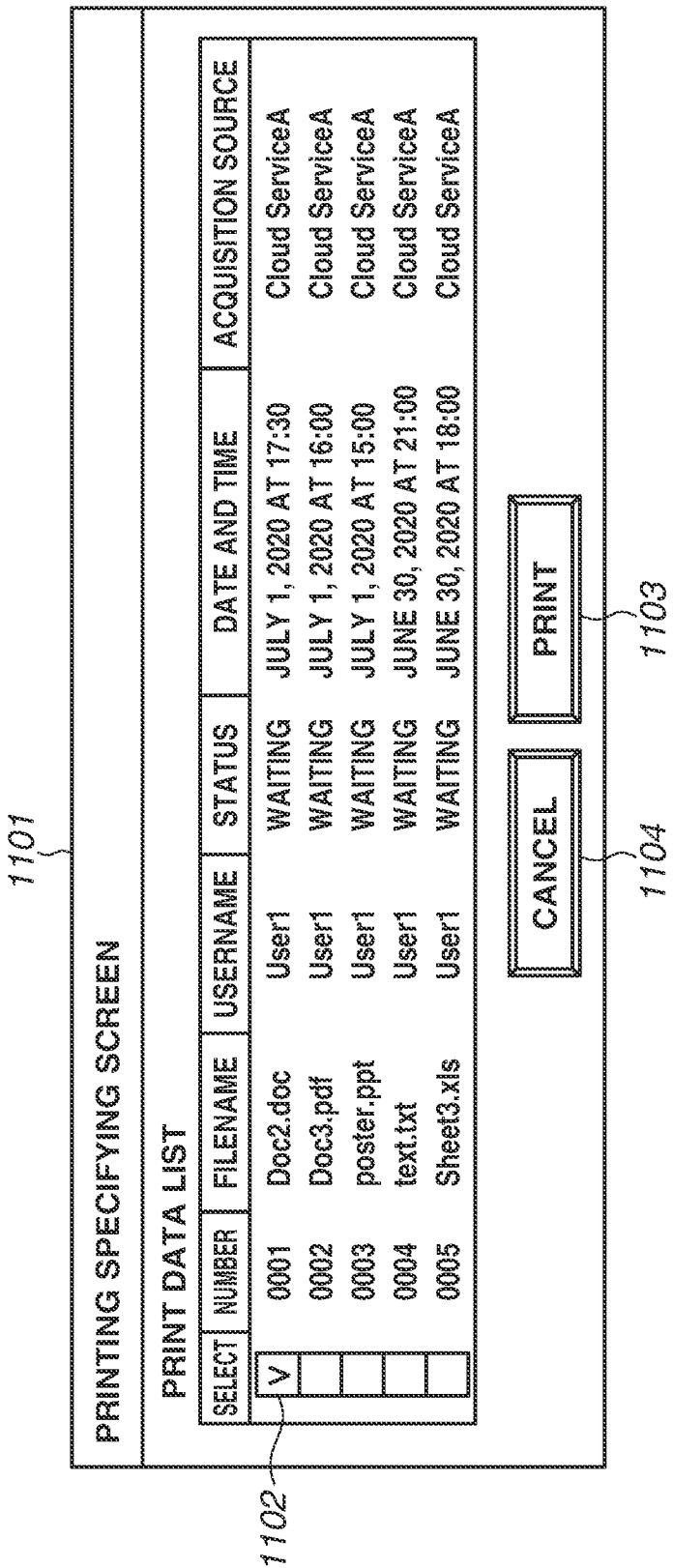

FIG.12A

AUTHENTICATION TYPE PRIORITY SETTING (1201)

| AUTHENTICATION METHOD | AUTHENTICATION TYPE | PRIORITY LEVEL |
|---|---|---|
| ONE-TIME PASSWORD AUTHENTICATION | POSSESSION AUTHENTICATION | PRIORITY LEVEL 1 |
| MOBILE AUTHENTICATION | POSSESSION AUTHENTICATION | PRIORITY LEVEL 2 |
| ID CARD | POSSESSION AUTHENTICATION | PRIORITY LEVEL 3 |
| FINGERPRINT AUTHENTICATION | BIOMETRIC AUTHENTICATION | PRIORITY LEVEL 2 |
| FACE AUTHENTICATION | BIOMETRIC AUTHENTICATION | PRIORITY LEVEL 2 |
| ID/PW | KNOWLEDGE AUTHENTICATION | PRIORITY LEVEL 3 |
| PIN | KNOWLEDGE AUTHENTICATION | PRIORITY LEVEL 4 |

[ ENTER ] [ CANCEL ]

FIG.12B

ENVIRONMENT-BY-ENVIRONMENT AUTHENTICATION PRIORITY LEVEL SETTING (1211)

| AUTHENTICATION TYPE | SETUP ENVIRONMENT A | SETUP ENVIRONMENT B | SETUP ENVIRONMENT C |
|---|---|---|---|
| KNOWLEDGE AUTHENTICATION | ALL SELECTABLE | SELECTABLE | UNSELECTABLE |
| POSSESSION AUTHENTICATION | ALL SELECTABLE | PRIORITY LEVEL 3 OR HIGHER SELECTABLE | PRIORITY LEVEL 2 OR HIGHER SELECTABLE |
| BIOMETRIC AUTHENTICATION | ALL SELECTABLE | PRIORITY LEVEL 3 OR HIGHER SELECTABLE | PRIORITY LEVEL 2 OR HIGHER SELECTABLE |

[ ENTER ] [ CANCEL ]

FIG.14

| AUTHENTICATION METHOD | SETUP ENVIRONMENT A | SETUP ENVIRONMENT B | SETUP ENVIRONMENT C |
|---|---|---|---|
| ONE-TIME PASSWORD AUTHENTICATION | SELECTABLE | SELECTABLE (PRIORITY LEVEL 1) | SELECTABLE (PRIORITY LEVEL 1) |
| MOBILE AUTHENTICATION | SELECTABLE | SELECTABLE (PRIORITY LEVEL 2) | SELECTABLE (PRIORITY LEVEL 2) |
| ID CARD | SELECTABLE | SELECTABLE (PRIORITY LEVEL 3) | UNSELECTABLE |
| FINGERPRINT AUTHENTICATION | SELECTABLE | SELECTABLE (PRIORITY LEVEL 2) | SELECTABLE (PRIORITY LEVEL 2) |
| FACE AUTHENTICATION | SELECTABLE | SELECTABLE (PRIORITY LEVEL 2) | SELECTABLE (PRIORITY LEVEL 2) |
| ID/PW | SELECTABLE | SELECTABLE (PRIORITY LEVEL 3) | UNSELECTABLE |
| PIN | SELECTABLE | UNSELECTABLE | UNSELECTABLE |

1401

PRINTING APPARATUS RECEIVING AUTHENTICATION INFORMATION, METHOD FOR CONTROLLING THE SAME, SERVER APPARATUS HAVING AN AUTHENTICATION FUNCTION, METHOD FOR CONTROLLING THE SAME, AND STORAGE MEDIUM

BACKGROUND OF THE INVENTION

Field of the Invention

The present invention relates to a printing apparatus, a method for controlling a printing apparatus, a server apparatus, and a method for controlling a server apparatus.

Description of the Related Art

Print methods have been diversified, and, as one example thereof, there has been a print method in which a user accesses a cloud service from an information apparatus or a printing apparatus and prints print data stored in the cloud service. These circumstances have also led to an increase in usages that a printing apparatus is accessed directly from an external network such as the Internet instead of being only accessed within a firewall.

In recent years, the prevalence of such usages has been bringing about a shift to a defense concept based on zero-trust security without only applying the defense concept based on perimeter security such as a firewall. The defense based on zero-trust security refers to a concept of strictly defending an apparatus directly connected to the Internet based on a belief that people are fundamentally evil.

One of many security measures for protecting printing apparatuses is a user authentication function when the printing apparatuses are used.

After succeeding in the user authentication for the printing apparatus, the user is allowed to refer to and operate print target data (print data) retained in a print server or the like connected to the printing apparatus via a network or print data stored in a cloud storage. The user specifies the print data via an operation unit, and the printing apparatus prints the print data specified by the user.

A method that employs multi-factor authentication is available as user authentication for printing apparatuses that satisfy a high security level. Japanese Patent Application Laid-Open No. 2019-155610 discusses a printing apparatus that conducts user authentication by performing two-factor authentication using IC card authentication and biometric authentication. A user is allowed to operate the printing apparatus and refer to and operate print data in a cloud storage via the printing apparatus after succeeding in the user authentication.

SUMMARY OF THE INVENTION

According to an aspect of the present invention, a server with which a first printing apparatus and a second printing apparatus communicate via a network, includes a reception unit and a transmission unit. The reception unit receives first information from the first printing apparatus and receives second information different from the first information from the second printing apparatus. The transmission unit transmits, to the first printing apparatus, one or a plurality of types of user authentication methods corresponding to the first information for logging in the first printing apparatus, and transmits, to the second printing apparatus, one or a plurality of types of user authentication methods corresponding to the second information for logging in the second printing apparatus that includes at least one type different from the one or plurality of types of user authentication methods corresponding to the first information.

Further features of the present invention will become apparent from the following description of exemplary embodiments with reference to the attached drawings.

BRIEF DESCRIPTION OF THE DRAWINGS

FIG. 2A illustrates a block diagram of an example of a hardware configuration of a multifunction peripheral according to the exemplary embodiment. FIG. 2B illustrates a block diagram of an example of a hardware configuration of a management server according to the exemplary embodiment.

FIG. 11 illustrates an example of a printing specifying screen.

FIG. 12A illustrates an example of a screen for setting a priority level of an authentication type. FIG. 12B illustrates an example of a screen for setting an environment-by-environment authentication priority level.

FIG. 14 is an example of a diagram illustrating a concept of a prioritized authentication method setting.

DESCRIPTION OF THE EMBODIMENTS

In the following description, exemplary embodiments for implementing the present invention will be described with reference to the drawings. The present exemplary embodiments will be described citing a multifunction peripheral (a printing apparatus, a digital multifunction peripheral, or an MFP) having a user authentication function as an example. However, in general, the user authentication function is also used for single function peripherals (SFPs), and therefore the applicable range is not limited to multifunction peripherals.

Figure 1:
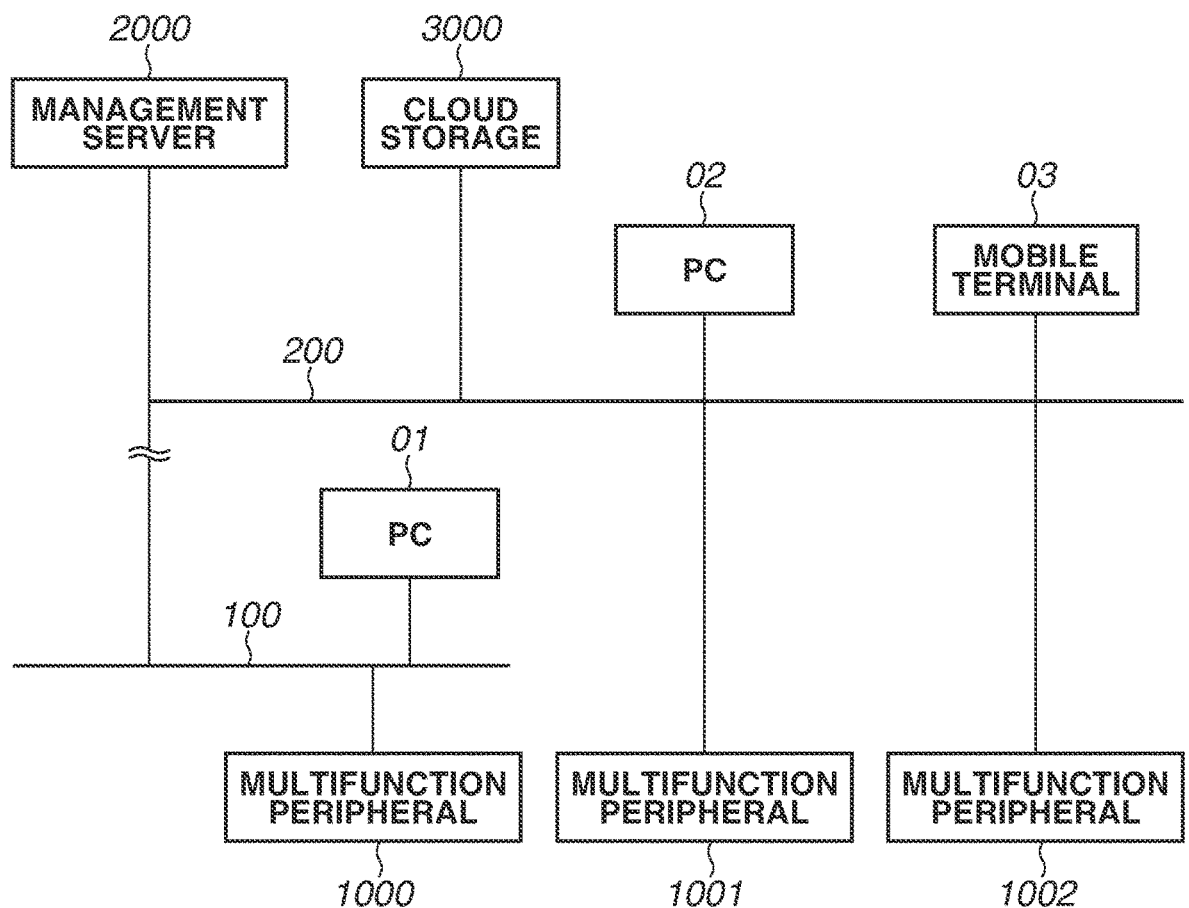
FIG. 1 illustrates a block diagram of an example of a system configuration according to an exemplary embodiment.

A printing apparatus may be installed at various locations, such as an office protected by entrance and exit management and a firewall, a shared space e.g., a co-working space, and inside a house for teleworking. Thus, if a printing apparatus uniformly provides the same user authentication function even when a difference is present in a setup (installation) location or a route via which the user authentication is conducted, a security issue may arise. For example, if only single-factor authentication is employed in a lower-security environment, such as a co-working space, than in an office, the printing apparatus may be exposed to a high risk in terms of security. FIG. 1 is an example of a network configuration diagram of a first exemplary embodiment. A system in which printing is carried out by the network configuration illustrated in FIG. 1 will be referred to as a "printing system" in the present exemplary embodiment.

A multifunction peripheral 1000 having a print function for forming an image onto a sheet can transmit and receive, for example, print data, scanned image data, and management information of a device between apparatuses to information processing apparatus via an internal network 100.

The multifunction peripheral 1000 can also communicate with a management server 2000 via the internal network 100 and an external network 200. In the present embodiments, the internal network 100 is assumed to be a company's internal network protected by a firewall or a gateway in an office. The external network 200 is assumed to be a network directly accessible from the Internet. However, these networks are not limited thereto. A personal computer (PC) 01 can request user authentication to the multifunction peripheral 1000, and refer to and operate the multifunction peripheral 1000 via the network 100.

The management server 2000 and a cloud storage 3000 can communicate with, for example, a cloud storage, and a file server, via the external network 200. A multifunction peripheral 1001 and a multifunction peripheral 1002 are multifunction peripherals directly connected to the external network 200. In the present exemplary embodiment, the multifunction peripheral 1001 is assumed to be installed in a shared space such as a co-working space. The multifunction peripheral 1002 is assumed to be installed inside a house for teleworking. However, these places are not limited thereto. A PC 02 and a mobile terminal 03 can request user authentication to the multifunction peripherals 1000, 1001, and 1002, and refer to and operate the multifunction peripherals 1000, 1001, and 1002 via the network 200. The cloud storage 3000 is assumed to be installed in the external network 200 in the present exemplary embodiment, but may be installed in the company's internal network protected by the firewall and the gateway.

In the present exemplary embodiment, when the multifunction peripherals 1000, 1001 and 1002 refer to or operate print data stored in the cloud storage 3000, these operations are performed via the management server 2000. The PCs 01 and 02 and the mobile terminal 03 can directly access this cloud storage 3000.

The printing system includes only limited numbers of apparatuses for the multifunction peripherals, the management server, the cloud storage, the PCs, and the mobile terminal as illustrated in FIG. 1. However, the numbers are not limited thereto and a plurality of apparatuses may be used for each of the apparatuses in FIG. 1.

FIG. 2A is a block diagram illustrating a schematic configuration of the multifunction peripheral 1000 according to the present exemplary embodiment.

A central processing unit (CPU) 201 executes a software program of the multifunction peripheral 1000 and controls the entire apparatus. A read only memory (ROM) 202 stores, for example, a boot program of the multifunction peripheral 1000, and a fixed parameter. A random access memory (RAM) 203 stores, for example, a program and temporary data when the CPU 201 controls the multifunction peripheral 1000. A hard disk drive (HDD) 204 stores system software, an application, and various kinds of data. The CPU 201 executes the boot program stored in the ROM 202, reads the program stored in the HDD 204 and stores the program in the RAM 203. The CPU 201 then executes the stored program, thereby controlling the operation of the multifunction peripheral 1000. A network interface (I/F) control unit 205 controls transmission/reception of data to/from the network 100.

A scanner I/F control unit 206 controls a scanner 211 to read an original document. A printer I/F control unit 207 controls, for example, print processing performed by a printer 212. A panel control unit 208 controls a touch panel-type operation panel 210, and controls a display of various kinds of information and an input of an instruction from a user. A bus 209 connects the CPU 201, the ROM 202, the RAM 203, the HDD 204, the network I/F control unit 205, the scanner OF control unit 206, the printer I/F control unit 207, and the panel control unit 208 to one another. A control signal from the CPU 201 and a data signal between the individual devices are transmitted and received via the bus 209.

The multifunction peripherals 1001 and 1002 according to the present exemplary embodiment are connected to, via the network I/F control unit 205, a different network (NW) from the NW to which the multifunction peripheral 1000 is connected. However, the basic configurations of the multifunction peripherals 1001 and 1002 are substantially similar to that illustrated in FIG. 2A.

FIG. 2B is a block diagram illustrating a schematic configuration of the management server 2000 according to the present exemplary embodiment.

A CPU 221 executes a software program in the management server 2000 and controls the entire apparatus. A ROM 222 stores, for example, a boot program of the management server 2000, and a fixed parameter. A RAM 223 stores, for example, a program and temporary data when the CPU 221 controls the management server 2000. An HDD 224 stores system software, an application, and various kinds of data. The CPU 221 executes the boot program stored in the ROM 222, reads the program stored in the HDD 224 and stores the program in the RAM 223. The CPU 221 then executes the stored program, thereby controlling the operation of this management server 2000. A network OF control unit 225 controls transmission/reception of data to/from the network 200. An operation directed to the management server 2000 is performed from a PC or a mobile terminal via the network I/F control unit 225. In the present exemplary embodiment, an operation unit displayed on the PC or mobile terminal will be referred to as a remote user interface (UI). A bus 229 connects the CPU 221, the ROM 222, the RAM 223, the HDD 224, and the network I/F control unit 225 to one another. A control signal from the CPU 221 and a data signal between the individual devices are transmitted and received via the bus 229.

Figure 3A:
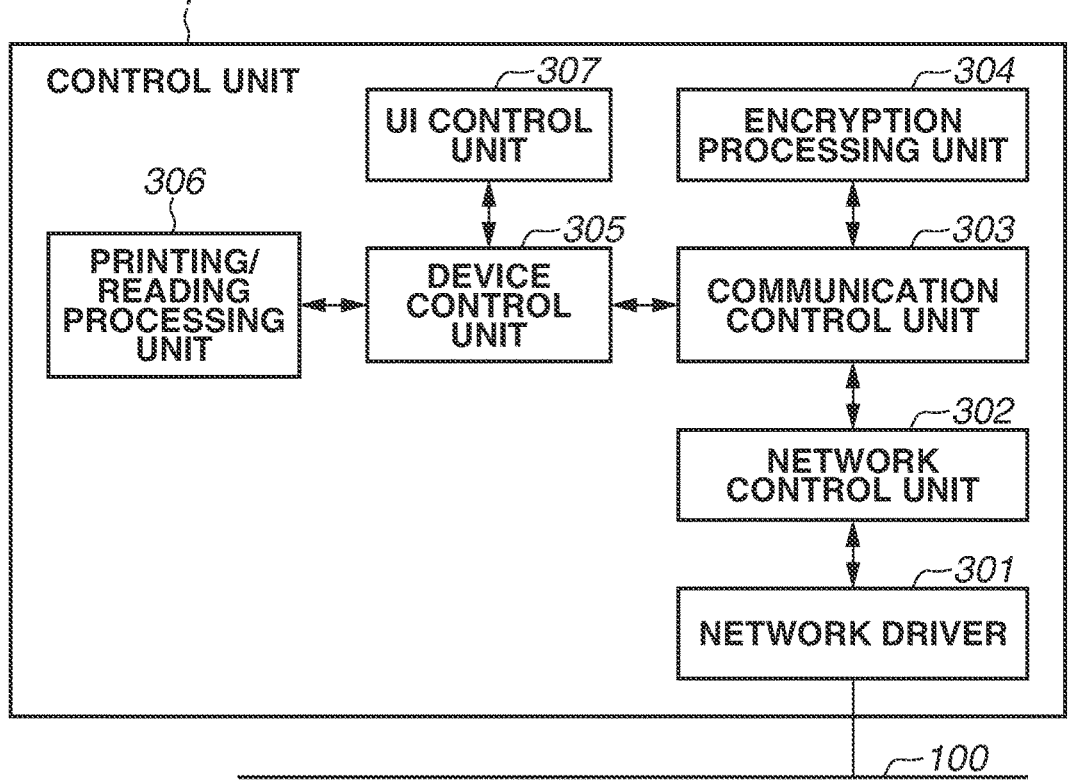
FIG. 3A illustrates a block diagram of an example of a software configuration of the multifunction peripheral according to the exemplary embodiment.

FIG. 3A is a block diagram illustrating software modules included in the multifunction peripheral 1000 according to the first exemplary embodiment. The software modules illustrated in FIG. 3A are realized by the CPU 201 executing the program read and stored in the RAM 203.

A network driver 301 transmits and receives data to and from the outside via the network 100 by controlling the network I/F control unit 205 connected to the network 100.

A network control unit 302 transmits and receives data by controlling communication at a transport layer or lower in a network communication protocol, such as the Transmission Control Protocol/Internet Protocol (TCP/IP). A communication control unit 303 is a module for controlling a plurality of communication protocols supported by the multifunction peripheral 1000. Encrypted communication, such as Transport Layer Security (TLS), supported by the multifunction peripheral 1000 is also executed by the communication control unit 303.

An encryption processing unit 304 is a module for performing various kinds of encryption processing, such as data encryption and decryption processing, generation and verification of an electronic signature, and generation of a hash value. The encryption processing unit 304 also performs encryption processing in the encrypted communication processing such as TLS performed by the communication control unit 303.

A device control unit 305 is a module for comprehensively controlling the multifunction peripheral 1000 by generating a control command or control data for the multifunction peripheral 1000. The device control unit 305 execute user authentication that is instructed via the operation panel 210 and the panel control unit 208, or the network OF control unit 205.

A printing/reading processing unit 306 is a module for performing functions, such as printing executed by the printer 212 and reading of an original document executed by the scanner 211. In the present exemplary embodiment, a scanning or printing instruction directed to the multifunction peripheral 1000 can also be executed by the user's instruction via the operation panel 210. The operation panel 210 and the panel control unit 208 are controlled by a UI control unit 307.

The control unit including the above-described software configuration of the multifunction peripheral 1000 illustrated in FIG. 3A will be hereinafter referred to as a control unit 1. In the present specification, the control unit 1 includes the CPU 201, the ROM 202, the RAM 203, and the HDD 204 of the multifunction peripheral 1000. Portions of below-described sequences and flowcharts processed by the multifunction peripheral 1000 are stored in any storage means of the ROM 202, the RAM 203, and the HDD 204 of the control unit 1 and are executed by the CPU 201.

Figure 3B:
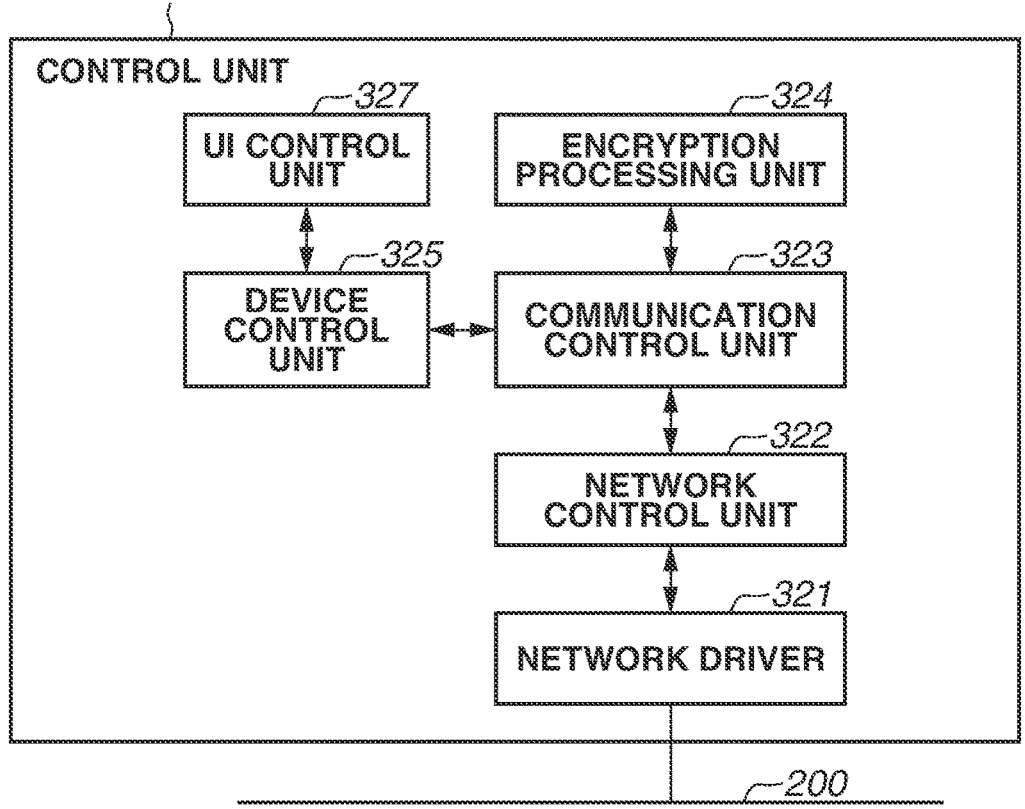
FIG. 3B illustrates a block diagram of an example of a software configuration of the management server according to the exemplary embodiment.

FIG. 3B is a block diagram illustrating software modules included in the management server 2000 according to the first exemplary embodiment. The software modules illustrated in FIG. 3B are realized by the CPU 221 executing the program read and stored in the RAM 223.

A network driver 321 transmits and receives data to and from the outside via the network 200 by controlling the network I/F control unit 225 connected to the network 200.

A network control unit 322 transmits and receives data by controlling communication at a transport layer or lower in a network communication protocol such as TCP/IP. A communication control unit 323 is a module for controlling a plurality of communication protocols supported by the management server 2000. Encrypted communication, such as TLS, supported by the management server 2000 is also executed by the communication control unit 323.

An encryption processing unit 324 is a module for performing various kinds of encryption processing such as data encryption and decryption processing, generation and verification of an electronic signature, and generation of a hash value. The encryption processing unit 324 also performs encryption processing in the encrypted communication processing such as TLS performed by the communication control unit 323.

A device control unit 325 is a module for comprehensively controlling the management server 2000 by generating a control command or control data for the management server 2000. In the present exemplary embodiment, an operation directed to the management server 2000 is performed from the remote UI that is operable from a PC or a mobile terminal via the network I/F control unit 225. This remote UI is controlled by a UI control unit 327.

The control unit including the above-described software configuration of the management server 2000 illustrated in FIG. 3B will be hereinafter referred to as a control unit 2. In the present specification, the control unit 2 includes the CPU 221, the ROM 222, the RAM 223, and the HDD 224 of the management server 2000. Portions of below-described sequences and flowcharts processed by the management server 2000 are stored in any storage means of the ROM 222, the RAM 223, and the HDD 224 of the control unit 2 and are executed by the CPU 221.

Figure 4:
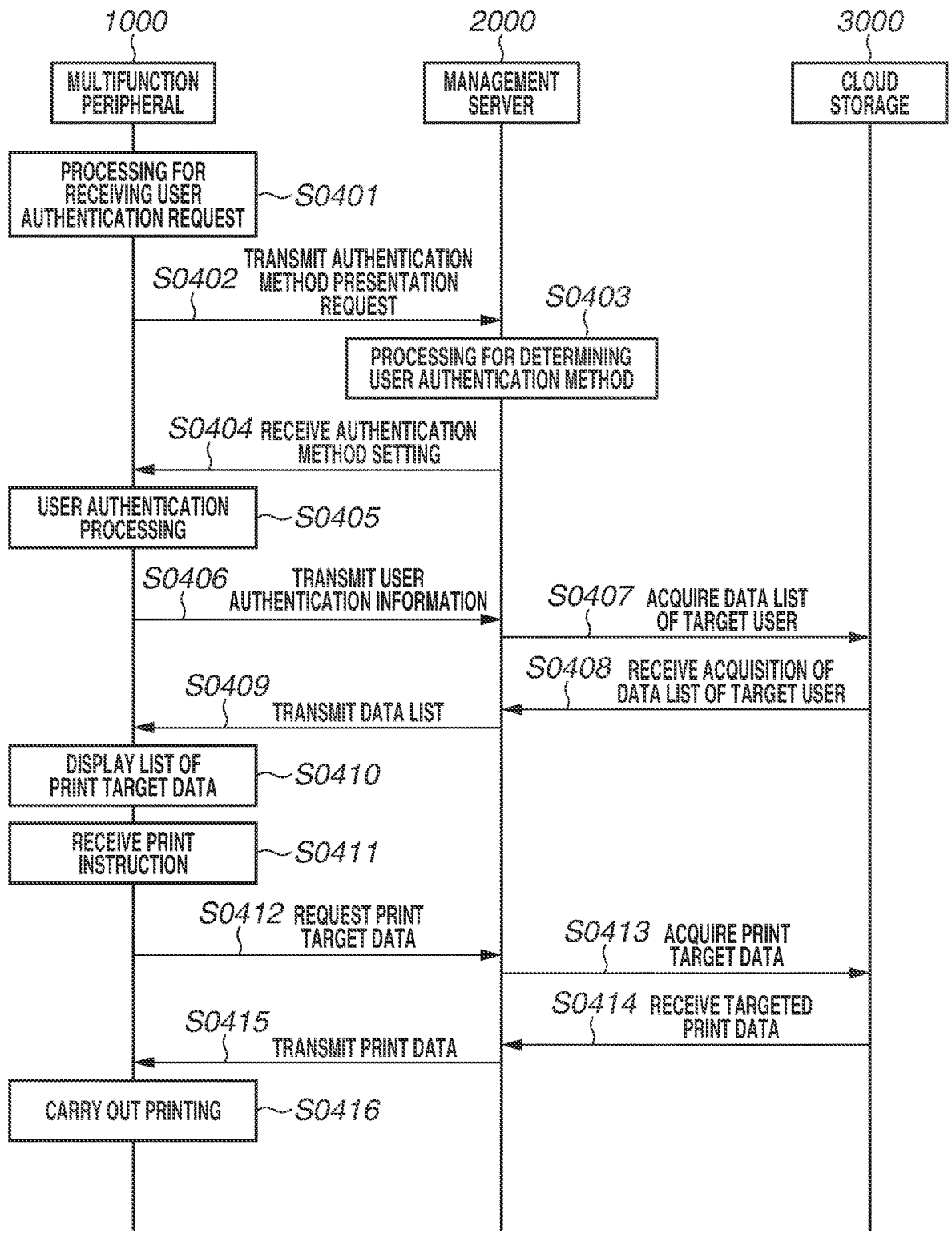
FIG. 4 illustrates an example of a flowchart illustrating a processing flow from reception of a user authentication request to execution of printing according to the exemplary embodiment.

FIG. 4 is a flowchart illustrating a flow of overall processing in which the multifunction peripheral 1000 receives the user authentication, determines a user authentication method, executes the user authentication, and prints a print target data after the user authentication, in the system according to the first exemplary embodiment.

In the present exemplary embodiment, the multifunction peripheral 1000 performs the user authentication, receives a print instruction via the operation unit, and controls the printing. The print target data is stored in the cloud storage 3000.

The management server 2000 acquires the print target data from the cloud storage 3000 based on user information transmitted from the multifunction peripheral 1000, and presents the print target to the multifunction peripheral 1000. The management server 2000 also performs control of determining which user authentication method the multifunction peripheral 1000 should perform based on device information from the multifunction peripheral 1000. The user authentication in the present exemplary embodiment refers to performing authentication by comparing authentication information that the multifunction peripheral 1000 acquires from the user and associated information from an identification (ID) management list held by the management server 2000. However, the method for the user authentication is not limited thereto.

The multifunction peripheral 1000 and the management server 2000 are assumed to be separate apparatuses in the present exemplary embodiment. However, the configuration is not limited thereto, and the multifunction peripheral 1000 may include the functions of the management server 2000 therein.

Further, the management server 2000 refers to the cloud storage 3000, but may refer to, for example, an on-premise file server, a plurality of cloud storages, or a plurality of servers, and the destination into which the print target data is stored and to which the management server 2000 refers is not limited.

The sequence in FIG. 4 is started in reaction to a user authentication request issued to the multifunction peripheral 1000.

In step S0401, the control unit 1 of the multifunction peripheral 1000 receives a user authentication request from a user.

Figure 5:
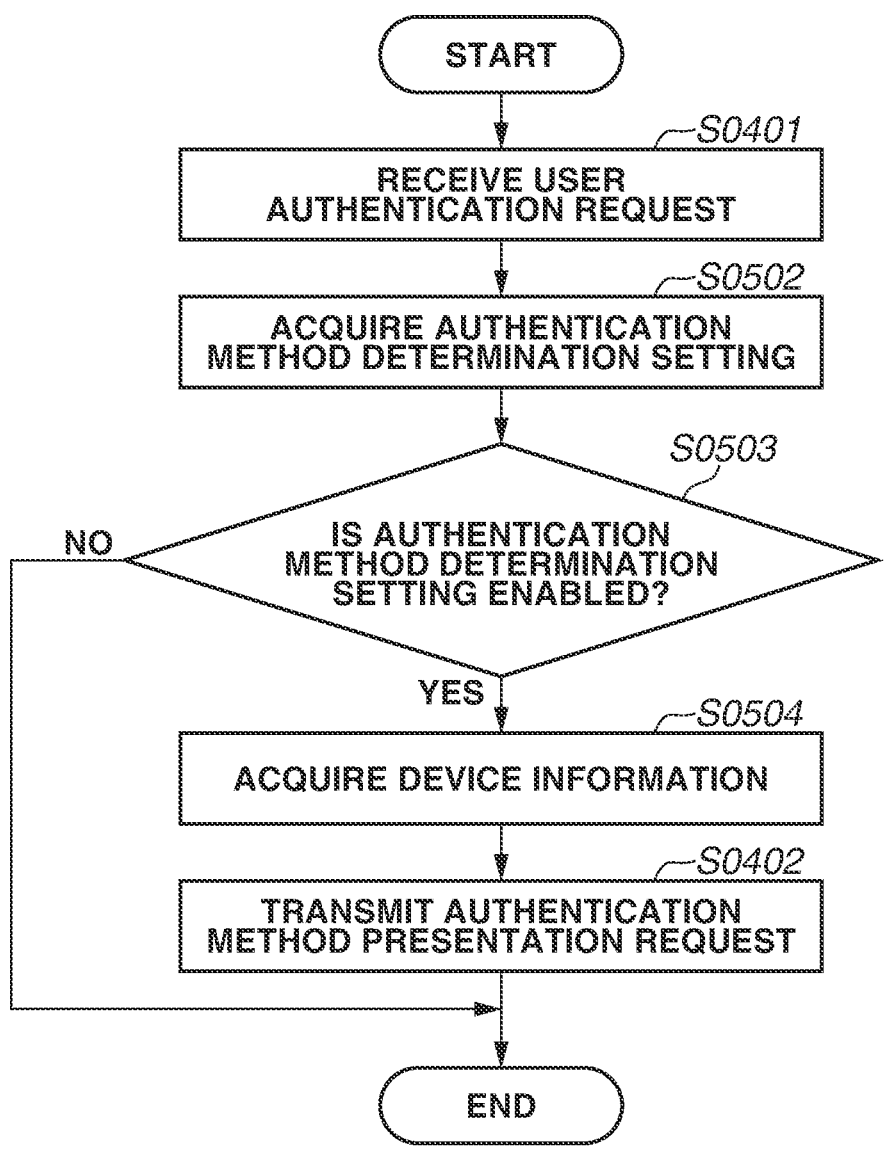
FIG. 5 illustrates an example of a flowchart indicating a processing flow for receiving the user authentication request according to the exemplary embodiment.

FIG. 5 is a flowchart illustrating processing when the user authentication request is received that is started from the processing of step S0401 in FIG. 4. This processing is achieved by the CPU 201 of the control unit 1 executing the program read and stored in the RAM 203.

In step S0401, the control unit 1 receives the user authentication request. This is control of receiving processing for, for example, causing a login screen to be displayed on the operation panel 210 of the multifunction peripheral 1000 or causing, from the PC 01 or 02 or the mobile terminal 03, a remote UI screen to be displayed via the network 100 or 200. The control unit 1 receives the user authentication request based on, for example, processing in which the multifunction peripheral 1000 wakes up due to a wake-up factor such as a signal from a human detection sensor (not illustrated) or the operation panel 210. The processing then proceeds to step S0502.

In step S0502, the control unit 1 acquires a setting of whether to determine the authentication method.

Figure 6:
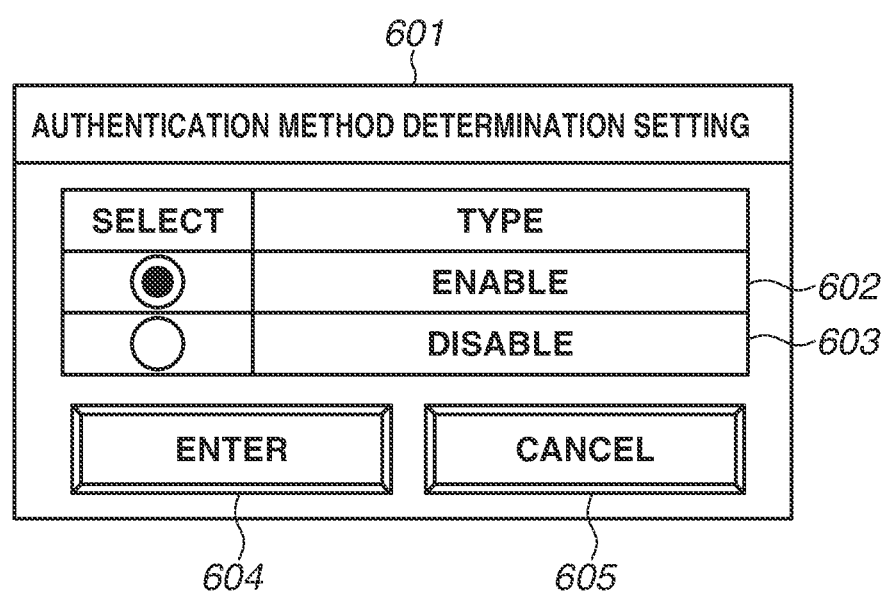
FIG. 6 illustrates an example of a setting screen for determining an authentication method.

FIG. 6 illustrates a screen 601 for setting whether to determine the authentication method according to the present exemplary embodiment. The screen 601 is displayed by the operation panel 210 and set by an administrator. The screen 601 includes an enable button 602, a disable button 603, an enter button 604, and a cancel button 605. If the setting of determining the authentication method is enabled, the multifunction peripheral 1000 inquires, to the management server 2000, information about which authentication method is be used to realize the user authentication function, and provides the authentication method to the user of the multifunction peripheral 1000 based on the information. FIG. 6 illustrates a screen example when the enable button 602 is set to ON. When the enter button 604 is pressed, the control unit 1 stores the setting value into the HDD 204. The processing then proceeds to step S0503.

In step S0503, the control unit 1 determines whether the setting of determining the authentication method is enabled. If the control unit 1 determines that the setting of determining the authentication method is enabled in step S0503 (YES in step S0503), the processing proceeds to step S0504.

In step S0504, the control unit 1 acquires a device environment setting from the HDD 204 of the multifunction peripheral 1000.

Figure 7:
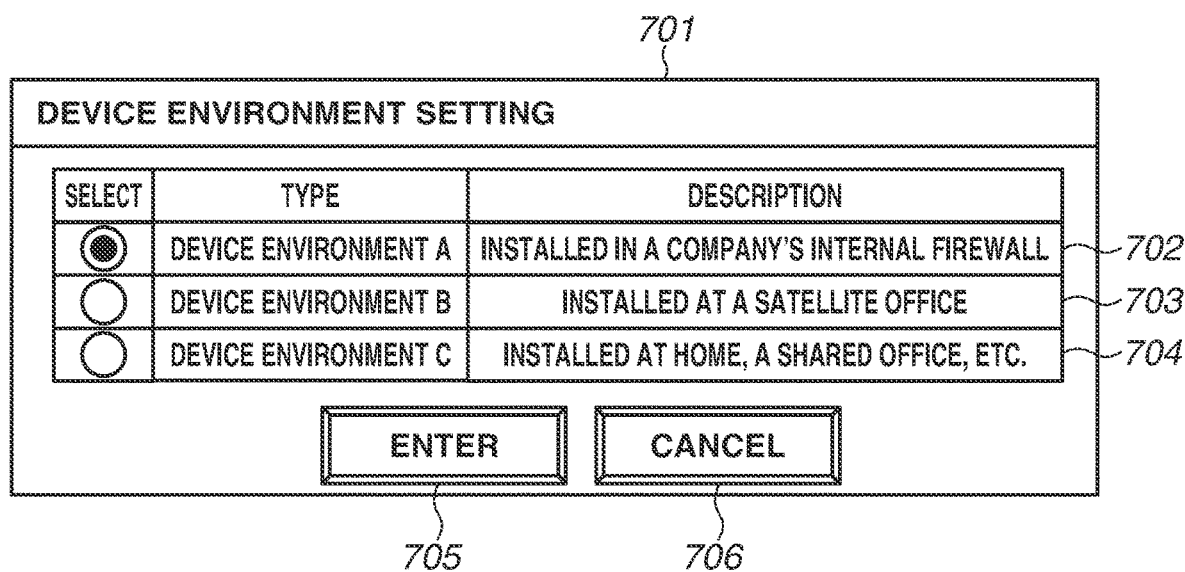
FIG. 7 illustrates an example of a screen for setting an environment of a device.

FIG. 7 illustrates a screen 701 for setting a device environment according to the present exemplary embodiment, and the screen 701 is displayed by, for example, the operation panel 210 of the multifunction peripheral 1000. A device environment A 702, a device environment B 703, and a device environment type C 704 are set on the screen 701 in the present exemplary embodiment. The screen 701 includes an item indicating in which environment the multifunction peripheral 1000 is installed, and the item is set by the administrator when the multifunction peripheral 1000 is installed. The example illustrated in FIG. 7 is a screen example in which "device environment A: installed within a company's internal firewall" is set. The screen example indicates an example in which the device environment is switched depending on whether a firewall is present in an environment within a company's internal firewall, or an environment at a satellite office. However, classifications of the device environment is not limited thereto. For example, even an inside of the company protected by the same firewall may be divided depending on the setup environment, like an executive officer's room classified into the device environment A 702, an ordinary office room classified into the device environment B 703, and a meeting room classified into the device environment type C 704. Alternatively, for example, the device environment may not be divided depending on the environment based on the location, like a multifunction peripheral classified into the device environment A 702, a laser beam printer classified into the device environment B 703, and an inkjet printer classified into the device environment type C 704.

It is assumed that the administrator sets a predetermined item using the screen 701 from the operation panel 210 in the present exemplary embodiment. However, this setting may be handled in such a manner that the control unit 1 automatically identifies the type and determines the setting based on the network setting and the security setting of the multifunction peripheral 1000.

The screen 701 includes an enter button 705 and a cancel button 706. When the enter button 705 is pressed, the control unit 1 stores the setting value in the HDD 204.

Subsequently to step S0504, the processing proceeds to step S0402.

In step S0402, the control unit 1 transmits an authentication method presentation request to the management server 2000 based on the device environment setting acquired in step S0504. The present processing then ends. The step S0402 is associated with the processing of step 0402 in FIG. 4. In step S0402, the control unit 1 also transmits the set device environment of the multifunction peripheral 1000 to the management server 2000 at the same time. The device environment set on the multifunction peripheral 1000 is transmitted to the management server 2000 in the present exemplary embodiment, but the data transmitted to the management server 2000 is not limited to the device environment. The control unit 1 may be configured to transmit, for example, the IP address, the serial number, the product number, or a Global Positioning System (GPS) signal of the multifunction peripheral 1000.

For example, in a case where the product number is transmitted, the environment in which the product is used is expected to some degree like a product designed for office use, a product designed for commercial printing, a product designed for household use, and so on. Thus, transmitting the product number to the management server 2000 allows the authentication method to be switched depending on the environment in which the product is used to some degree.

If the control unit 1 determines that the setting of determining the authentication method is disabled in step S0503 (NO in step S0503), the present processing ends.

Referring back to FIG. 4, the remaining sequence will be further described. After the processing of step S0402, in step S0403, the management server 2000 performs processing for determining the authentication method.

Figure 8:
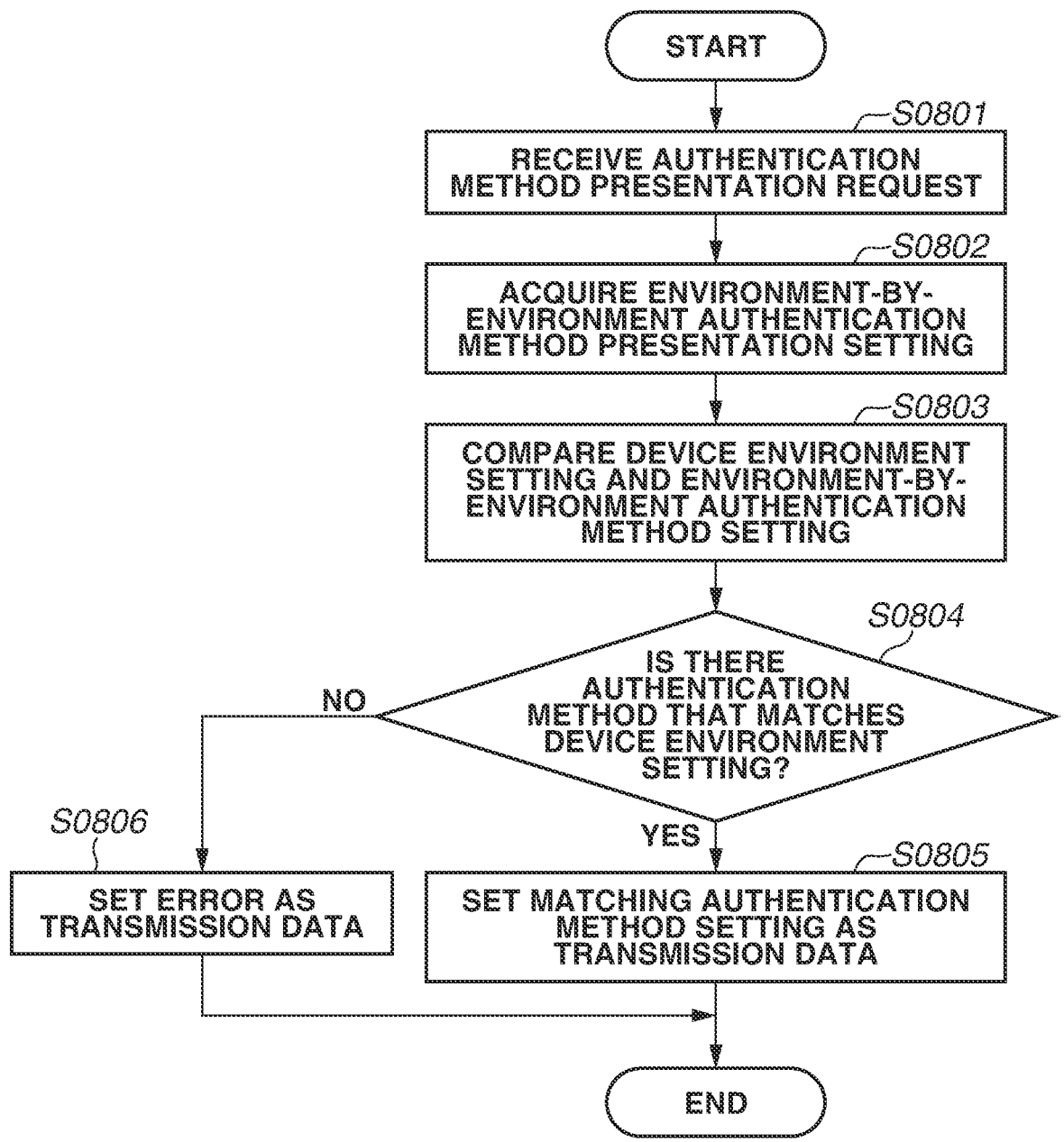
FIG. 8 illustrates an example of a flowchart indicating a processing flow for determining user authentication according to a first exemplary embodiment.

FIG. 8 is a flowchart illustrating the processing of determining the user authentication that is started after the processing of step S0403 in FIG. 4. The processing is achieved by the CPU 221 of the control unit 2 executing the program read and stored in the RAM 223.

In step S0801, the control unit 2 receives the authentication method presentation request transmitted from the multifunction peripheral 1000. The authentication method presentation request also includes information about the device environment setting acquired in the processing of step S0504 in FIG. 5 performed in the multifunction peripheral 1000 and information about an authentication method presentation setting.

In step S0802, the control unit 2 acquires an environment-by-environment authentication method setting from the HDD 224.

Figure 9:
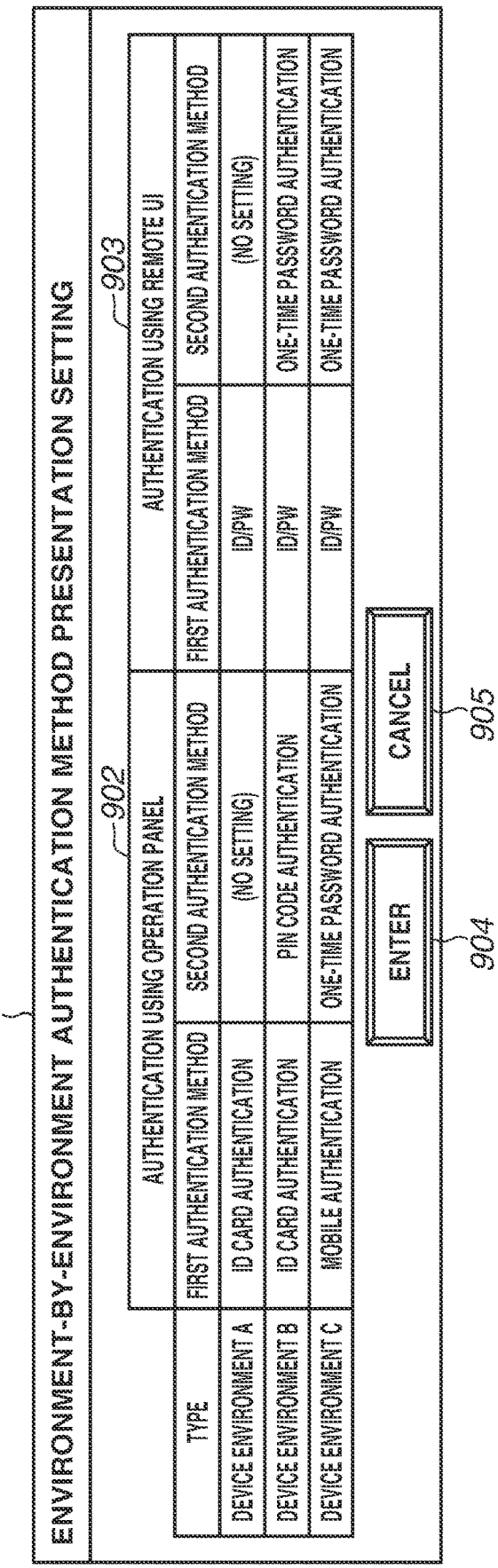
FIG. 9 illustrates an example of a screen for setting an environment-by-environment authentication method.

FIG. 9 illustrates a screen 901 for setting the environment-by-environment authentication method according to the present exemplary embodiment, and the setting is performed in the management server 2000. The user performs the setting by causing the screen 901 to be displayed from the PC or the mobile terminal via the network I/F control unit 225 as the remote UI. On the screen 901 in the present exemplary embodiment, a setting 902 of the authentication method using the operation panel and a setting 903 of the authentication method using the remote UI can be set for each type of device environment. These settings allow a first authentication method and a second authentication method to be set for each device environment. Device environments A, B and C illustrated in FIG. 9 are settings associated with the device environments A, B and C illustrated in FIG. 7, and an administrator of the management server 2000 sets the device environments A, B and C in advance in conformity with the type of the device environment of the multifunction peripheral 1000. In the example illustrated in FIG. 9, the authentication using the remote UI for the device environment A is set, as single-factor authentication, with ID and password authentication selected for the first authentication method and no setting selected for the second authentication method. The authentication using the operation panel for the device environment B indicates an example set, as two-factor authentication, with ID card authentication set as the first authentication method and personal identification number (PIN) code authentication set as the second authentication method. Mobile authentication in the present exemplary embodiment refers to an authentication method in which the multifunction peripheral identifies a mobile terminal via, for example, Bluetooth® communication, Wireless Fidelity (Wi-Fi) communication, or Near Field Communication (NFC) communication. However, the communication method may be another method without being limited thereto. The screen 901 for setting the authentication method for each environment includes information for determining which authentication method is used by the multifunction peripheral 1000 to perform the user authentication.

The authentication includes up to second authentication methods in the present exemplary embodiment, but the authentication may employ multi-factor authentication based on three or more authentication methods or multi-step authentication. Further, the printing system may be configured in such a manner that each authentication method is set by being selected from a plurality of choices, and how each authentication method is set is not limited. Further, another authentication method, such as fingerprint authentication and face authentication, may also be set besides the authentication methods set in FIG. 9.

The screen 901 includes an enter button 904 and a cancel button 905. When the enter button 904 is pressed, the control unit 2 stores the setting value in the HDD 224.

After the processing of step S0802, the processing illustrated in FIG. 8 proceeds to step S0803.

In step S0803, the control unit 2 compares the device environment setting of the multifunction peripheral 1000 acquired in step S0801 and the environment-by-environment authentication method setting acquired in step S0802. The processing then proceeds to step S0804. The device environment setting of the multifunction peripheral 1000 is the information transmitted from the control unit 1 of the multifunction peripheral 1000 to the management server 2000 in step S0402 in the present exemplary embodiment. However, the device environment setting of each multifunction peripheral may be registered with the management server 2000 in advance, and how the device environment setting is acquired is not limited.

In step S0804, the control unit 2 determines whether there is a setting for presenting the environment-by-environment authentication method that matches the device environment setting.

If the control unit 2 determines that there is a setting for presenting the environment-by-environment authentication method that matches the device environment setting in step S0804 (YES in step S0804), the processing proceeds to step S0805. The setting of the authentication method that matches a specific condition on the screen 901 for setting the environment-by-environment authentication method in FIG. 9 will be referred to as a "user authentication method setting (a user authentication method)" in the present exemplary embodiment. For example, if the authentication using the operation panel is requested to a multifunction peripheral installed in an environment corresponding to the device environment B, the user authentication method setting has "the first authentication method: the ID card authentication" and "the second authentication method: the PIN code authentication".

In step S0805, the control unit 2 generates this user authentication method setting that matches the condition as transmission data to transmit to the multifunction peripheral 1000. The processing then proceeds to step S0404 in FIG. 4, and the control unit 2 transmits the generated transmission data indicating the user authentication method to the multifunction peripheral 1000.

In step S0804, the control unit 2 determines whether there is an environment-by-environment authentication method that matches the device environment setting. If the control unit 2 determines that there is not such an authentication method (NO in step S0804), the processing proceeds to step S0806, and the control unit 2 generates an error as transmission data to transmit to the multifunction peripheral 1000. The processing then proceeds to step S0404 in FIG. 4.

In step S0404, the control unit 1 of the multifunction peripheral 1000 receives the user authentication method from the management server 2000. If the control unit 1 has received the user authentication method via the processing of step S0805 at this time, the control unit 1 stores the received contents in the HDD 204 as the first authentication method and the second authentication method. If the control unit 1 has received an error via the processing of step S0806, the control unit 1 does not update to maintain the first authentication method and the second authentication method stored in the HDD 204 as the user authentication methods set by default in advance.

After the processing of step S0404, the processing illustrated in FIG. 4 proceeds to step S0405.

Figure 10:
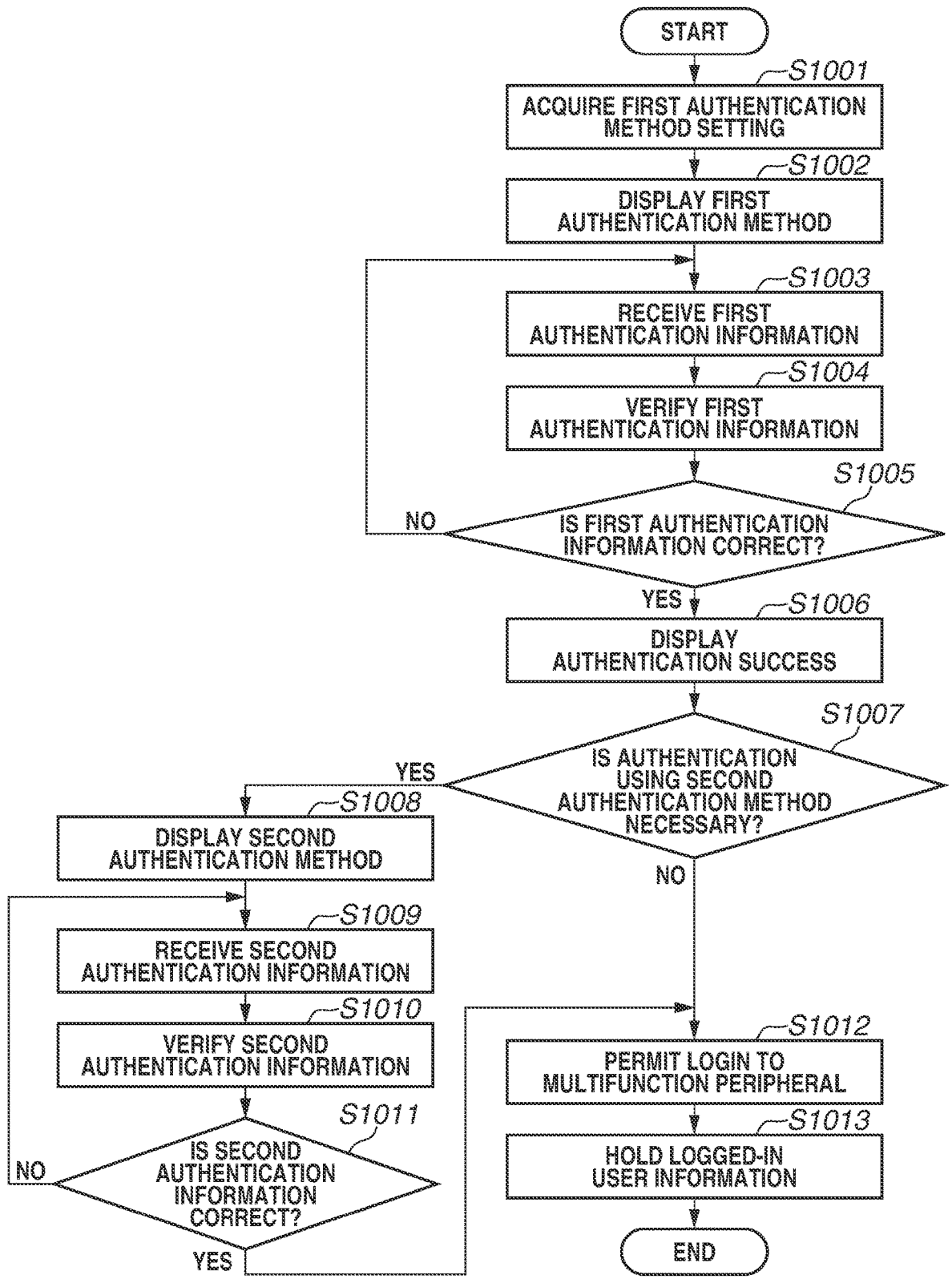
FIG. 10 illustrates an example of a flowchart indicating a processing flow of a user authentication according to the exemplary embodiment.

In step S0405, the control unit 1 performs user authentication processing illustrated in FIG. 10.

FIG. 10 is a flowchart illustrating the processing for the user authentication that is started from the processing of step S0405 in FIG. 4. This processing is achieved by the CPU 201 of the control unit 1 executing the program read and stored in the RAM 203.

In step S1001, the control unit 1 acquires the first authentication method setting from the HDD 204.

In step S1002, the control unit 1 displays the user authentication function associated with the first authentication method setting acquired in step S1001. At this time, the control unit 1 displays a login screen on the operation panel 210 if the first authentication method setting is the user authentication from the operation panel 210. If the first authentication method setting is the user authentication from the PC 01 or 02 or the mobile terminal 03, the control unit 1 displays the login screen on the remote UI screen via the network 100 or 200.

In step S1003, the control unit 1 receives first authentication information. For example, if the acquired first authentication method setting is the ID and password authentication, the control unit 1 receives information about a user ID and an input of a password as the authentication information from the user via the operation panel 210. The input authentication information is held in the RAM 203 via the panel control unit 208. In the present exemplary embodiment, the RAM 203 is used to temporarily store the user information and the password input by the user. However, the user information and the password may be stored in another storable device such as the HDD 204 and the storage used at this time is not limited. The same also applies to exemplary embodiments described below, and the storage used for this purpose is neither limited similarly. If the processing in step S1003 is, for example, the face authentication, an image on a camera connected to the operation panel 210 is handled as the first authentication information.

In step S1004, the device control unit 305 of the control unit 1 verifies the input first authentication information. For example, in the case of the ID and password authentication, the device control unit 305 compares the password input by the user and a correct password to verify whether the input password is correct.

At this time, the above-described correct password is a password associated using the ID management list based on the ID input by the user.

The ID management list is assumed to be stored in the HDD 224 included in the management server 2000 in the present exemplary embodiment. However, the storage location is not limited, and the ID management list may be stored in, for example, the HDD 204 included in the printing apparatus, or may be stored in a so-called Identity as a Service (IDaaS).

The processing then proceeds to step S1005.

In step S1005, the control unit 1 determines whether the first authentication information verified by the control unit 1 is correct.

If the control unit 1 determines that the input first authentication information is not valid in step S1005 (NO in step S1005), the control unit 1 causes an error message to be displayed on the operation panel 210 or the remote UI. Then, the processing proceeds to step S1003.

If the control unit 1 determines that the input first authentication information is valid in step S1005 (YES in step S1005), the processing proceeds to step S1006. In step S1006, the control unit 1 causes an image notifying the user that the authentication based on the first authentication method has succeeded to be displayed on the operation panel 210 or the remote UI screen. In the present exemplary embodiment, the authentication success is displayed in step S1006, but the display on the operation panel 210 or the remote UI screen may be omitted. The processing then proceeds to step S1007.

In step S1007, the control unit 1 acquires the second authentication method setting from the HDD 204, and determines whether the user authentication based on the second authentication method is necessary. The determination about whether the user authentication based on the second authentication method is necessary to be performed will be referred to as an "execution determination" in the present exemplary embodiment.

If the control unit 1 determines that the user authentication based on the second authentication method is necessary to be performed in step S1007 (YES in step S1007), the processing proceeds to step S1008. In step S1008, the control unit 1 displays the user authentication function associated with the second authentication method setting acquired in step S1001.

In step S1009, the control unit 1 receives second authentication information.

In step S1010, the control unit 1 verifies the input second authentication information.

In step S1011, it is determined whether the second authentication information verified by the control unit 1 is correct.

If it is determined that the input second authentication information is not valid in step S1011 (NO in step S1011), the control unit 1 causes an error message to be displayed on the operation panel 210 or the remote UI. The processing then proceeds to step S1009.

If it is determined that the input second authentication information is valid in step S1011 (YES in step S1011), the processing proceeds to step S1012. In step S1012, the control unit 1 permits a login to the multifunction peripheral 1000. Then, the processing proceeds to step S1013.

If the control unit 1 determines that the user authentication based on the second authentication method is not necessary in step S1007 (NO in step S1007), the processing proceeds to step S1012. In step S1012, the control unit 1 permits a login to the multifunction peripheral 1000. The processing then proceeds to step S1013.

The user authentication depending on the environment in which the multifunction peripheral is installed can be switched with the aid of these control procedures in FIG. 8 and FIG. 10.

An example of the present exemplary embodiment will now be described. Suppose that the multifunction peripheral 1000 illustrated in FIG. 1 has a setting for the device environment A where the multifunction peripheral 1000 is installed within a firewall, the multifunction peripheral 1001 has a setting for the device environment B where the multifunction peripheral 1001 is placed in a shared space, and the multifunction peripheral 1002 has a setting for the device environment C where the multifunction peripheral 1002 is placed at home.

Details will now be described as examples in a case where the user performs the user authentication to each of these multifunction peripherals from the operation panel 210. In the multifunction peripheral 1000, the processing in FIG. 10 proceeds to the processing taken in the case of NO in step S1007, and the user authentication is conducted with only the ID card authentication required as the first authentication method and nothing set as the second authentication method for the authentication using the operation panel. The authentication method is set in this manner to reduce the user's inconvenience resulting from the employment of two-factor authentication because a multifunction peripheral in an office is additionally protected by security such as the entrance and exit management. In contrast, in the multifunction peripheral 1001, the processing in FIG. 10 proceeds to the processing taken in the case of YES in step S1007, and the ID card authentication is required as the first authentication method and the PIN code authentication is required as the second authentication method for the authentication using the operation panel. The authentication method is set in this manner to require two-factor authentication for the multifunction peripheral 1001 based on an assumption that a shared space is lower in security due to the lack of the entrance and exit management and the like compared to the case of the multifunction peripheral 1000.

Further, in the multifunction peripheral 1002, the processing in FIG. 10 proceeds to the processing taken in the case of YES in step S1007, and the mobile authentication is required as the first authentication method and the one-time password authentication is required as the second authentication method for the authentication using the operation panel. The authentication method is set in this manner assuming that stricter security management is required under the device environment C which is placed at home, and is set to a high-security authentication method such as a one-time password. In this manner, the present exemplary embodiment allows the multifunction peripheral to switch the authentication method, such as the number of authentication steps and whether the authentication type is single-factor authentication or multi-factor authentication, depending on the environment in which the multifunction peripheral is placed.

After the processing of step S1012, the processing illustrated in FIG. 10 proceeds to step 1013.

In step S1013, the control unit 1 holds the logged-in user information in the RAM 206. Then, the processing in FIG. 10 ends.

Step S0406 and the steps subsequent thereto in FIG. 4 indicate a processing flow in a case where the print data stored in the cloud storage 3000 is printed after the user authentication directed to the multifunction peripheral 1000. In step S0406, the control unit 1 of the multifunction peripheral 1000 transmits the user authentication information of the authenticated user to the management server 2000.

In step S0407, the control unit 2 of the management server 2000 transmits a request to acquire a data list that is a print target of the target user to the cloud storage 3000.

The data list in the present exemplary embodiment refers to a list in which, for example, a filename, a file format, and an update date and time are listed, but is not limited thereto.

Further, as a login to the cloud storage 3000 at this time, the control unit 2 may refer to the ID management list held by the management server 2000 and log in using associated ID information for the cloud storage 3000. The above-described ID management list may be stored in the management server 2000 or may be managed using, for example, an IDaaS, but the storage used at this time is not limited thereto.

In step S0408, the control unit 2 acquires the data list from the cloud storage 3000. The control unit 2 of the management server 2000 stores the received data list in the HDD 224.

In step S0409, the control unit 2 transmits the data list to the multifunction peripheral 1000. The control unit 1 of the multifunction peripheral 1000 stores the received data list into the RAM 202.

In step S0410, the control unit 1 displays the print target data list on the operation panel 210 or the remote UI.

FIG. 11 illustrates an example of a printing specifying screen 1101 on which the print target data list is displayed according to the present exemplary embodiment. The printing specifying screen 1101 in the present exemplary embodiment includes a print target selection list 1102, a print execution start button 1103, and a print cancel button 1104. The user selects one or more files from the print target selection list 1102, and presses the print execution start button 1103, thereby instructing the multifunction peripheral 1000 to perform printing.

Step S0412 in FIG. 4 indicates a processing flow in a case where the multifunction peripheral 1000 is instructed in step S0411 to perform printing.

In step S0412, the control unit 1 requests acquisition of the print target data to the management server 2000.

In step S0413, the control unit 2 transmits a request to acquire the print target data instructed in step S0412 to the cloud storage 3000.

In step S0414, the control unit 2 receives the instructed print target data from the cloud storage 3000, and stores the print target data in the HDD 224.

In step S0415, the control unit 2 transmits the print data to the multifunction peripheral 1000. The control unit 1 of the multifunction peripheral 1000 stores the received print data in the HDD 204.

In step S0416, the control unit 1 reads the print data in the HDD 204, extracts and sends the print data to the printer I/F control unit 207, thereby printing the print data.

The processing in FIG. 4 is then ends.

As described above, control of switching between single-factor authentication and two-factor authentication, switching the step(s) taken in the authentication, and switching the user authentication method is employed depending on the security protection environment in which the printing apparatus is installed.

The present exemplary embodiment allows the user authentication function to be switched depending on the security protection environment of the printing apparatus, thereby being able to reduce the inconvenience of the user authentication for the user while ensuring the security. The present invention can be switching an authentication method depending on a printing apparatus and an environment in which the printing apparatus is installed.

A second exemplary embodiment of the present invention will now be described.

In the first exemplary embodiment, the user authentication function is switched depending on the security protection environment in which the printing apparatus is installed.

However, multifunction peripherals may have a plurality of user authentication functions. For example, some multifunction peripherals have a plurality of methods, such as the ID and password authentication, the ID card authentication, the fingerprint authentication, and the face authentication, as the authentication method for the authentication method via the operation panel.

The second exemplary embodiment will be described regarding control on such a multifunction peripheral having a plurality of user authentication methods for assigning priority levels to the authentication methods in advance and presenting the user authentication method depending on the security protection environment of the multifunction peripheral.

The present exemplary embodiment is similar to the first exemplary embodiment in terms of portions that are not described below, such as the network configuration diagram, the hardware and software configurations of the multifunction peripheral 1000, which is an information processing apparatus, and the management server 2000, and the print processing such as the reception of the print instruction and the execution of the printing.

FIG. 12A is a screen 1201 for setting a priority level of an authentication type according to the second exemplary embodiment. The screen 1201 is displayed on the remote UI on the PC or the mobile terminal via the network I/F control unit 225 of the management server 2000. The screen 1201 in the present exemplary embodiment includes an authentication method setting 1202, an authentication type setting 1203, an authentication priority level setting 1204, an authentication type priority level setting enter button 1205, and an authentication type priority level setting cancel button 1206.

On the screen 1201, the administrator of the management server 2000 sets the authentication type and the priority level of the authentication depending on the authentication method.

The authentication method setting 1202 allows the authentication methods provided to the multifunction peripherals 1000, 1001, and 1002 to be set.

The authentication type setting 1203 is an authentication type corresponding to the authentication method setting 1202, and authentication classification "knowledge authentication", "possession authentication", or "biometric authentication" is set therein in the present exemplary embodiment. The "knowledge authentication" is a method type that conducts authentication based on knowledge information, such as an ID, a password, and a PIN code. The "possession authentication" is a type of a method that conducts authentication based on a possession (possession information), such as an ID card, a mobile terminal, and a terminal that generates a one-time password. The "biometric authentication" is a type of a method that conducts authentication based on biometric information, such as fingerprint authentication and face authentication. The control unit 2 of the management server 2000 may automatically set the authentication type stored in association in advance or the administrator may define the authentication type directly, and how the authentication type is set is not limited.

The authentication priority level setting 1204 is the priority level of the authentication method corresponding to the authentication method setting. The administrator of the management server 2000 sets the priority level. In the present exemplary embodiment, a priority level 1 is assigned to a high-security authentication method. For example, the one-time password can ensure high security because only limited persons can confirm the password and the expiration period of the password is short, and therefore is set to the priority level 1. This classification of the priority level setting and the like are not limited because the criterion and the viewpoint vary operationally depending on a user using the multifunction peripheral and the administrator.

When the enter button 1205 is pressed, the control unit 2 stores the setting value in the HDD 224.

A screen 1211 illustrated in FIG. 12B is a screen for setting an environment-by-environment authentication priority level according to the second exemplary embodiment. The screen 1211 is displayed on the remote UI on the PC or the mobile terminal via the network I/F control unit 225 of the management server 2000. The screen 1211 in the present exemplary embodiment includes a priority level setting 1212, an enter button 1213, and a cancel button 1214.

The administrator of the management server 2000 sets the environment-by-environment authentication priority level from the remote UI. The screen 1211 allows the administrator to set which priority level condition is abided by to employ the user authentication method for each setup environment depending on the authentication type set on FIG. 12A. For example, in the case of the example in FIG. 12B, the setup environment A is assumed to be a high-security environment constructed within a company's internal firewall as indicated in the example in FIG. 7, and is defined in such a manner that any authentication method is selectable therein. In contrast, the setup environment C is assumed to be installed under a low-security environment such as a home or a shared office, and is defined in such a manner that the knowledge authentication is not selectable to prevent information such as the ID and the password from leaking and being exploited. Further, in this example, the setup environment C is defined in such a manner that only a setting satisfying a high authentication priority level that is 2 or higher, even in the possession authentication and the biometric authentication, is settable as the authentication method.

When the enter button 1213 is pressed, the control unit 2 stores the setting value in the HDD 224.

The screens illustrated in FIGS. 12A and 12B allow the administrator of the management server 2000 to assign the priority level to the authentication method in advance for each authentication method and each authentication type.

Figure 13:
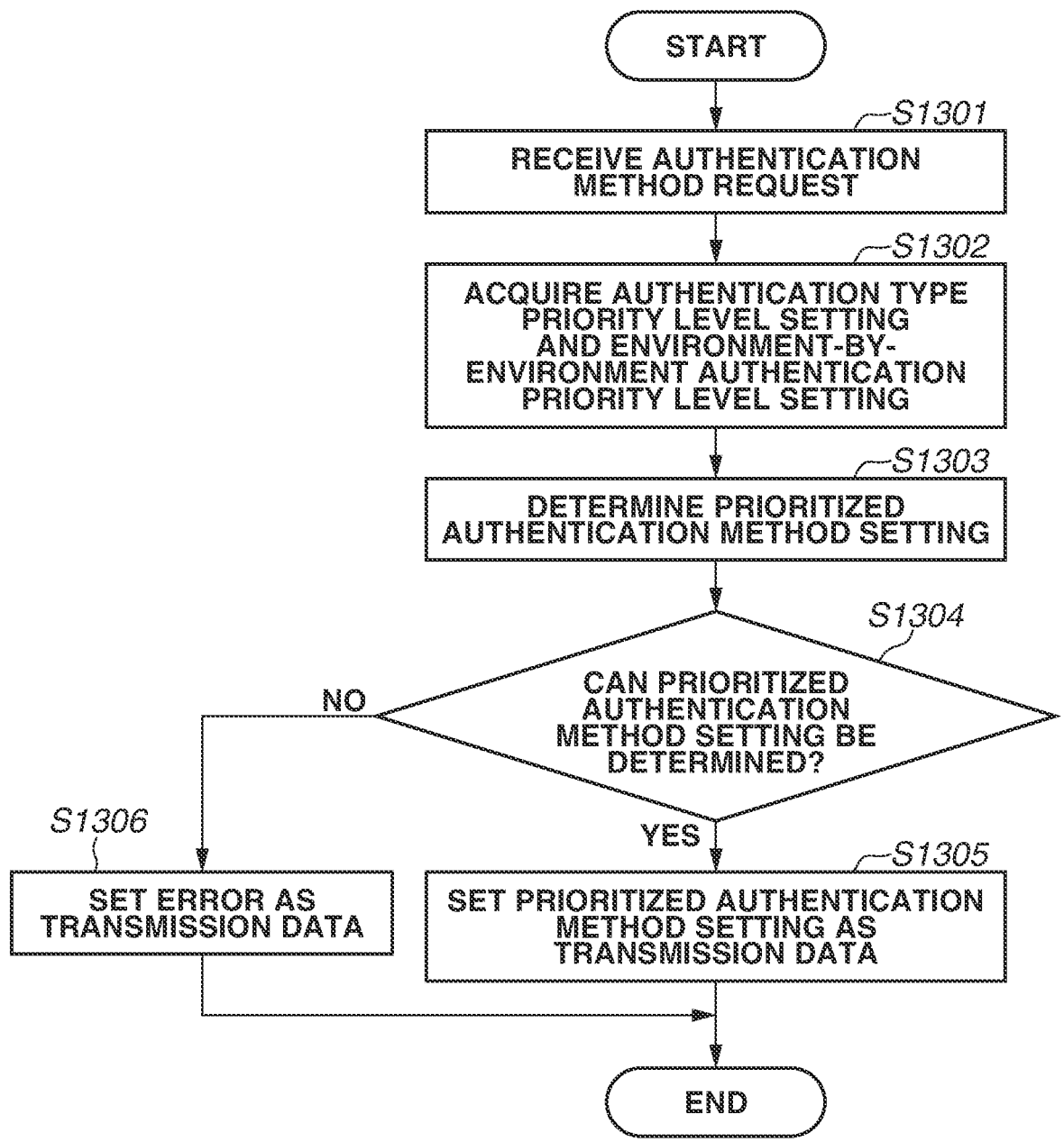
FIG. 13 illustrates an example of a flowchart indicating a processing flow for determining user authentication according to a second exemplary embodiment.

FIG. 13 is a flowchart in the system according to the second exemplary embodiment, and is a flowchart illustrating the processing for determining the user authentication that is started after the processing of step S0403 in FIG. 4. This processing is achieved by the CPU 221 of the control unit 2 executing the program read and stored in the RAM 223. The processing illustrated in FIG. 13 is a replacement of the processing in FIG. 8 according to the first exemplary embodiment, and the processing of steps S0802 to S0805 in FIG. 8 is replaced with the processing of steps S1302 to S1305 in FIG. 13.

The processing in FIG. 13 starts from step S1301.

In step S1301, the control unit 2 receives the authentication method presentation request transmitted from the multifunction peripheral 1000. The authentication method presentation request also includes information indicating the device environment setting acquired in the processing of step S0504 in FIG. 5 of the multifunction peripheral 1000, and information indicating whether the authentication is the authentication using the operation panel or the authentication using the remote UI, similarly to the first exemplary embodiment.

In step S1302, the control unit 2 acquires the priority level of the authentication type and the environment-by-environment authentication priority level set on FIGS. 12A and 12B, respectively, from the HDD 224.

In step S1303, the control unit 2 compares the device environment setting acquired in step S1301 and the priority level of the authentication type and the environment-by-environment authentication priority level acquired in step S1302, and determines the prioritized authentication method. This determined information is held in the RAM 223 of the management server 2000 as the prioritized authentication method.

FIG. 14 is a conceptual diagram 1401 of the prioritized authentication method according to the present exemplary embodiment. The diagram expresses an internal data structure, and the diagram is not displayed on the operation unit or the like. The conceptual diagram 1401 of the prioritized authentication method illustrated in FIG. 14 is an example of the information determined based on the settings on FIGS. 12A and 12B and is changed depending on the settings, and therefore the prioritized authentication method is not limited only to the definition illustrated in FIG. 14.

For example, FIG. 12B indicates that the knowledge authentication is unselectable for the setup environment C, and therefore the conceptual diagram 1401 of the prioritized authentication method indicates that the ID and password authentication and the PIN code authentication, which are knowledge authentication, are unselectable. Further, FIG.

12B indicates that the possession authentication and the biometric authentication satisfy the priority level 2 or higher, and therefore FIG. 14 indicates that the ID card authentication, which is set to the priority level 3 in FIG. 12A, is unselectable while the possession authentication and the biometric authentication corresponding to the priority level 2 or higher are selectable and the priority level of each of them is set therein.

In step S1304, the control unit 2 confirms whether the prioritized authentication setting can be determined.

If the control unit 2 confirms that the prioritized authentication setting in step S1304 (YES in step S1304), the processing proceeds to step S1305.

In step S1305, the control unit 2 generates the determined prioritized authentication setting as transmission data to transmit to the multifunction peripheral 1000. The processing then proceeds to step S0404 in FIG. 4.

If the control unit 2 confirms that the prioritized authentication setting cannot be determined, i.e., there is not even a single associated authentication method in step S1304 (NO in step S1304), the processing proceeds to step S1306. In step S1306, the control unit 2 generates an error as transmission data to transmit to the multifunction peripheral 1000. The processing then proceeds to step S0404 in FIG. 4.

The processing of step S0404 and the steps subsequent thereto in FIG. 4 is similar to that of the first exemplary embodiment. The control unit 1 of the multifunction peripheral 1000 refers to the prioritized authentication setting by the processing of step S1001 and step S1007 in FIG. 10, and sets the user authentication method. If a plurality of user authentication methods is acquired from the prioritized authentication setting, the control unit 1 selects an authentication method to which a high priority level is assigned. If the priority level setting is the same among them, the control unit 1 is assumed to present the plurality of authentication methods to the user and prompt the user to select one in the present exemplary embodiment, but the control unit 1 may present any one user authentication method and the operation in this case is not limited.

The above-described processing in steps S1301 to S1305 allows the authentication method to be presented to the multifunction peripheral with the priority level assigned thereto according to the security environment of the multifunction peripheral and the authentication type for the multifunction peripheral having the plurality of user authentication methods.

In the first exemplary embodiment, the management server determines the user authentication method depending on the security protection environment in which the printing apparatus is installed.

A third exemplary embodiment will be described regarding an authentication method in which the printing apparatus determines the user authentication method depending on the security protection environment in which the printing apparatus is installed. The present exemplary embodiment is similar to the first exemplary embodiment in terms of portions that will not be described below, such as the network configuration diagram, the hardware and software configurations of the multifunction peripheral 1000, which is an information processing apparatus, and the management server 2000, and the print processing such as the reception of the print instruction and the execution of the printing.

In the third exemplary embodiment, the screen 901 is displayed on the operation panel 210, and is set on the multifunction peripheral 1000.

Similarly, the screen 1201 and the screen 1211 in FIGS. 12A and 12B are also displayed on the operation panel 210.

Figure 15:
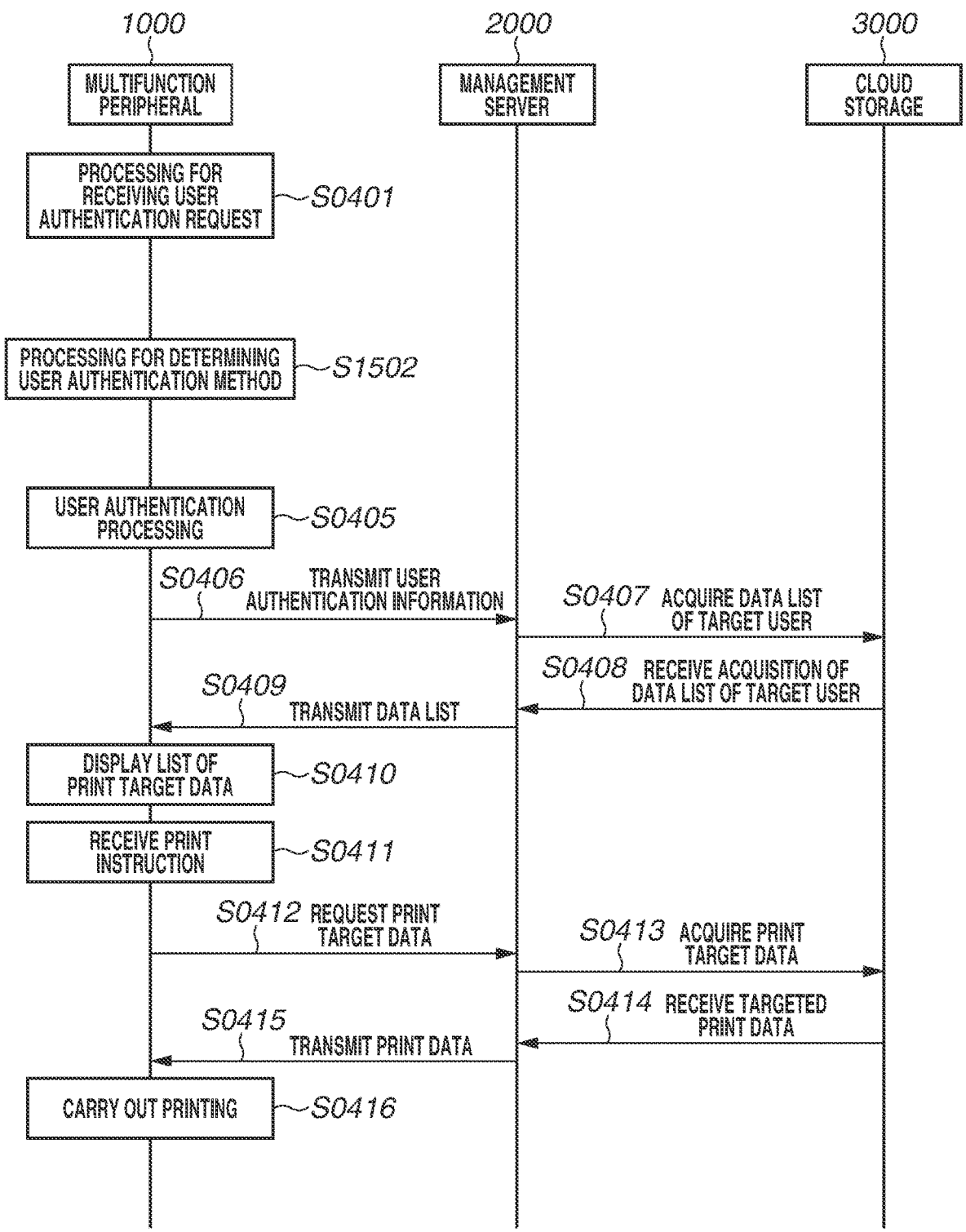
FIG. 15 illustrates an example of a flowchart indicating a processing flow from a reception of a user authentication request to an execution of the printing according to a third exemplary embodiment.

FIG. 15 is a flowchart illustrating a flow of overall processing in the system according to the another exemplary embodiment, including processing in which the multifunction peripheral 1000 receives the user authentication, determines the user authentication method, and conducts the user authentication until the multifunction peripheral 1000 prints the print target data after the user authentication.

In the present exemplary embodiment, the multifunction peripheral 1000 conducts the user authentication, receives the print instruction via the operation unit, and controls the printing. The print target data is stored in the cloud storage 3000. Regarding the cloud storage 3000 and the management server 2000, the printing system includes the management server 2000 that acquires print target data from the cloud storage 3000 based on the user information transmitted from the multifunction peripheral 1000 and presents the print target data to the multifunction peripheral 1000.

Steps S0401 and S0405 to S0416 illustrated in FIG. 15 are similar to steps S0401 and S0405 to S0416 illustrated in FIG. 4.

Figure 16:
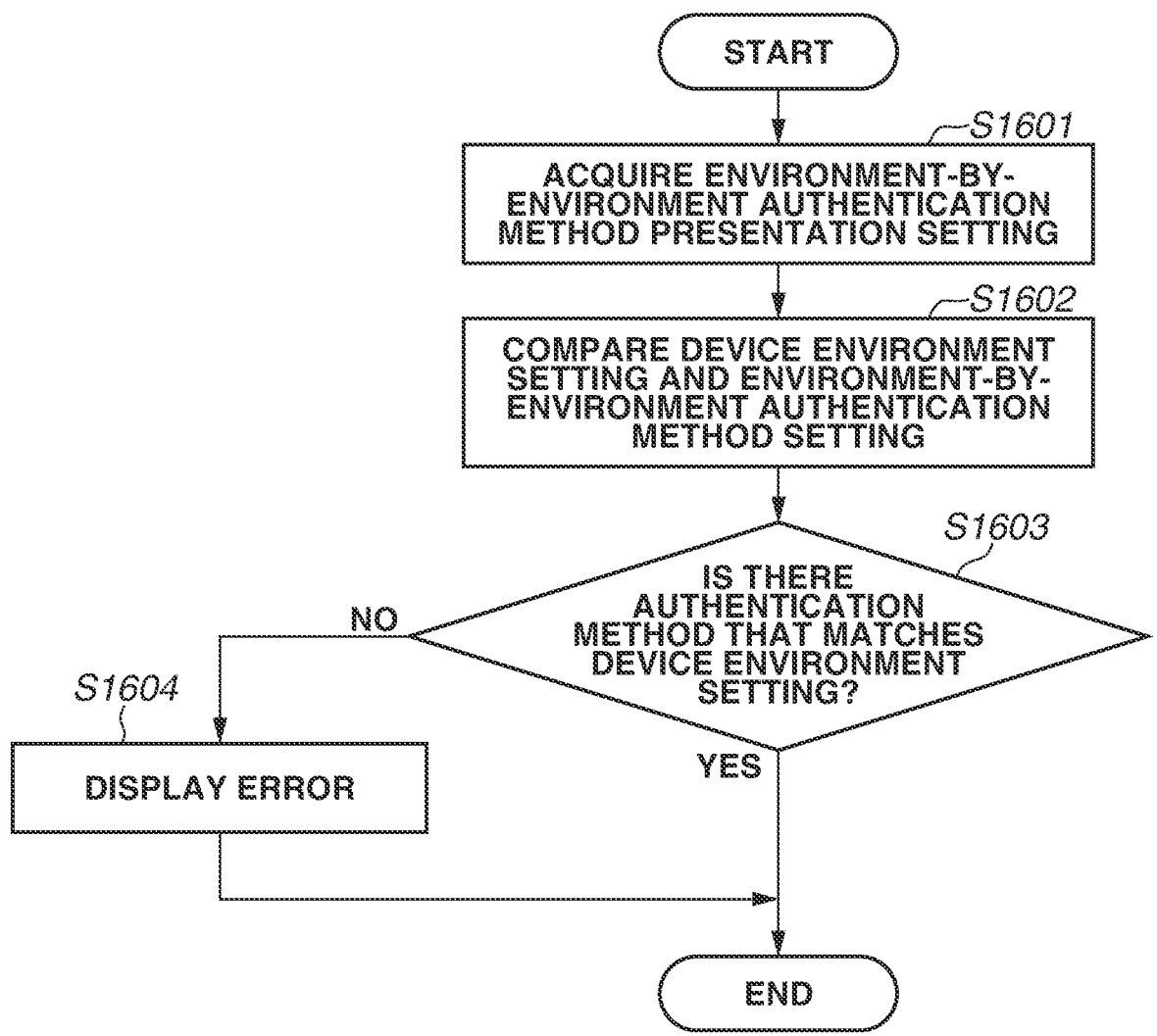
FIG. 16 illustrates an example of a flowchart indicating a processing flow of a user authentication according to the third exemplary embodiment.

After the user authentication request is received in step S0401, in step S1502, a user authentication method is determined. After the user authentication method is determined, the processing proceeds to step S0405. In step S405, user authentication processing is performed. Descriptions of the steps after step S405 will be omitted. FIG. 16 illustrates a flow of determining the user authentication method in step S1502.

The above processing is achieved by the CPU 201 of the control unit 1 executing the program read and stored in the RAM 203.

In step S1601, the control unit 1 acquires an environment-by-environment authentication method setting from the HDD 204.

In step S1602, the control unit 1 compares the device environment of the multifunction peripheral 1000 and the environment-by-environment authentication method setting acquired in step S1601.

In step S1603, the control unit 1 determines whether there is an environment-by-environment authentication method setting that matches the device environment setting.

If the control unit 1 determines that there is an environment-by-environment authentication method setting that matches the device environment setting in step S1603 (YES in step S1603), this flow ends.

If the control unit 1 determines that there is no environment-by-environment authentication method setting that matches the device environment setting in step S1603 (NO in step S1603), the processing proceeds to step S1604, and in step S1604, the control unit 1 displays an error.

The steps illustrated in FIGS. 15 and 16 allow the multifunction peripheral to determine the authentication method depending on the setup environment of the multifunction peripheral by itself and provide the user authentication depending on the determined authentication method.

According to one aspect of the present invention, it is possible to ensure the security while reducing the inconvenience of the user authentication for the user by switching the user authentication method depending on the setup environment of the printing apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-012780, filed Jan. 29, 2021, which is hereby incorporated by reference herein in its entirety.

What is claimed is:

1. A server with which a first printing apparatus and a second printing apparatus communicate via a network, the server comprising:
   a controller having one or more processors and one or more memories, the controller being configured:
      to receive first information from the first printing apparatus that has received a user authentication request and receive second information different from the first information from the second printing apparatus that has received a user authentication request; and
      to transmit, to the first printing apparatus, one or a plurality of types of user authentication methods corresponding to the first information for logging in to the first printing apparatus, and transmit, to the second printing apparatus, one or a plurality of types of user authentication methods corresponding to the second information for logging in to the second printing apparatus and including at least one type different from the one or plurality of types of user authentication methods corresponding to the first information,
   wherein the controller receives the first information in a case where a login screen is displayed on an operation unit of the first printing apparatus.

2. The server according to claim 1, wherein each of the one or the plurality of types of user authentication methods corresponding to the first information and the one or the plurality of types of user authentication methods corresponding to the second information includes at least a first user authentication method using first authentication information and a second user authentication method using second authentication information different from the first authentication information.

3. The server according to claim 2, wherein each of the first authentication information and the second authentication information is any one factor among knowledge information, possession information, and biometric information.

4. The server according to claim 3, wherein the first authentication information and the second authentication information are different factors of information.

5. The server according to claim 2, wherein the first information and the second information are information about setup locations at which the first printing apparatus and the second printing apparatus are installed, respectively.

6. The server according to claim 5, wherein the information about the setup locations is information indicating positions set to the first printing apparatus and the second printing apparatus.

7. The server according to claim 1, wherein the first information and the second information are Internet Protocol (IP) addresses of the first printing apparatus and the second printing apparatus, respectively.

8. The server according to claim 1, wherein the controller is configured to transmit an error in a case where there is no user authentication method corresponding to at least one of the first information and the second information.

9. The server according to claim 1, wherein the network includes at least a network not protected by a firewall.

10. A printing apparatus communicable with a server via a network, the printing apparatus comprising:
    a controller having one or more processors and one or more memories, the controller being configured:
       to set a setup location of the printing apparatus;
       to transmit, to the server from the printing apparatus that has received a user authentication request, information about the setup location; and
       to receive authentication information used for one or a plurality of types of authentication methods corresponding to the setup location,
    wherein the controller transmits the information in a case where a login screen is displayed on an operation unit of the printing apparatus.

11. The printing apparatus according to claim 10,
    wherein the server has an authentication function, and
    wherein the controller is configured to transmit the authentication information to the server.

12. The printing apparatus according to claim 11, wherein the plurality of types of user authentication methods includes at least a first user authentication method using first authentication information and a second user authentication method using second authentication information different from the first authentication information.

13. The printing apparatus according to claim 12, wherein the authentication information is any one factor among knowledge information, possession information, and biometric information.

14. The printing apparatus according to claim 13, wherein the first authentication information and the second authentication information are different factors of information.

15. The printing apparatus according to claim 10,
    wherein the controller is configured:
       to form an image on a sheet; and
       to receive from the server a result of user authentication performed depending on the authentication information, and wherein, in a case where a result indicating that the user authentication is approved is received, print data is allowed to be printed by the printing apparatus.

16. The printing apparatus according to claim 10, wherein the network includes at least a network not protected by a firewall.

17. A method for controlling a server with which a first printing apparatus and a second printing apparatus are communicable via a network, the method comprising:
  receiving first information from the first printing apparatus that has received a user authentication request and receiving second information different from the first information from the second printing apparatus that has received a user authentication request; and
  transmitting, to the first printing apparatus, one or a plurality of types of user authentication methods corresponding to the first information for logging in to the first printing apparatus, and transmitting, to the second printing apparatus, one or a plurality of types of user authentication methods corresponding to the second information for logging in to the second printing apparatus and including at least one type different from the one or plurality of types of user authentication methods corresponding to the first information,
  wherein the server receives the first information in a case where a login screen is displayed on an operation unit of the first printing apparatus.

18. A method for controlling a printing apparatus communicable with a server via a network, the method comprising:
  setting a setup location of the printing apparatus;
  transmitting, to the server from the printing apparatus that has received a user authentication request, information about the setup location; and
  receiving authentication information used for one or a plurality of types of authentication methods corresponding to the setup location,
  wherein the printing apparatus transmits the information in a case where a login screen is displayed on an operation unit of the printing apparatus.

19. A non-transitory computer-readable storage medium storing a computer program for causing a computer to perform a method for controlling a printing apparatus communicable with a server via a network, the method comprising:
  setting a setup location of the printing apparatus;
  transmitting, to the server from the printing apparatus that has received a user authentication request, information about the setup location; and
  receiving authentication information used for one or a plurality of types of authentication methods corresponding to the setup location,
  wherein the printing apparatus transmits the information in a case where a login screen is displayed on an operation unit of the printing apparatus.

* * * * *